United States Patent
Koch

(10) Patent No.: US 7,732,369 B2
(45) Date of Patent: Jun. 8, 2010

(54) METHOD AND DEVICE FOR CATALYTIC OXIDATION AND REDUCTION OF GASES AND VAPOURS BY CRYSTALLINE COMPOUNDS OF HEAVY METALS AND RARE EARTHS

(76) Inventor: Christian F. Koch, Schulstrasse 8, 96155 Buttenheim (DE)

( * ) Notice: Subject to any disclaimer, the term of this patent is extended or adjusted under 35 U.S.C. 154(b) by 74 days.

(21) Appl. No.: 11/865,767

(22) Filed: Oct. 2, 2007

(65) Prior Publication Data

US 2008/0085830 A1 Apr. 10, 2008

(30) Foreign Application Priority Data

Oct. 4, 2006 (DE) .................. 10 2006 046 884

(51) Int. Cl.
*B01J 23/00* (2006.01)
*C01B 13/00* (2006.01)

(52) U.S. Cl. .................. 502/303; 502/302; 502/304

(58) Field of Classification Search ......... 502/302–304, 502/324–326

See application file for complete search history.

(56) References Cited

U.S. PATENT DOCUMENTS

| 3,965,046 | A | * | 6/1976 | Deffeyes | .................. 502/337 |
| 4,857,499 | A | * | 8/1989 | Ito et al. | .................. 502/326 |
| 5,502,019 | A | * | 3/1996 | Augustine et al. | .................. 502/314 |
| 6,403,523 | B1 | * | 6/2002 | Cantrell et al. | .................. 502/174 |

* cited by examiner

*Primary Examiner*—Timothy C Vanoy
*Assistant Examiner*—Richard M Rump
(74) *Attorney, Agent, or Firm*—Schmeiser Olsen & Watts

(57) ABSTRACT

The invention describes the production of a catalyst for use in the oxidation and selective reduction with properties resembling the catalytic property of the noble metal catalysts, by formation of a crystal surface on catalyst supports from a synthesis crystal of the elements of the rare earths and the metal components cobalt and/or lanthanum produced in multiple stages.

9 Claims, No Drawings

METHOD AND DEVICE FOR CATALYTIC OXIDATION AND REDUCTION OF GASES AND VAPOURS BY CRYSTALLINE COMPOUNDS OF HEAVY METALS AND RARE EARTHS

CROSS-REFERENCE TO RELATED APPLICATIONS

This application claims priority to foreign application, specifically, to German Patent Application No. 102006046884.8, filed Oct. 4, 2006.

FIELD OF INVENTION

The invention describes the method for producing catalysts and their use in catalytic reaction systems as a substitute for platinum catalysts and redox systems, for example, the $DeNO_x$ synthesis.

BACKGROUND OF THE INVENTION

Some catalysts may be known as honeycomb or pouring layer catalysts. Aqueous solutions from a first component of a compound with lanthanum, cerium and cobalt, a second component platinum, a third component rhodium, and a fourth component from a wash coat of alumina, titanium dioxide and oxalic acid may be applied to the catalyst. One disadvantage of these honeycomb or pouring layer catalysts may be the small surface of the active substance, which is supplemented to a sufficient catalytic effect by the additional use of platinum and rhodium. Thus, the compounds of lanthanum, cerium and cobalt only act as an improved surface for the platinum, and allow an increased lifetime.

Surprisingly, it has now been found that when the level of platinum is almost completely substituted, the lifetime is increased, and the catalytic effect is substantially improved if the active substance is crystallized from rare earths and cobalt in multiple stages. Furthermore, the substances cobalt and manganese, and the rare earths lanthanum, cerium and yttrium may be used to transform the crystals, with a diameter from 1 to 0.1 μm and a length from 100 to 100,000 μm in a special multi-stage process.

SUMMARY OF THE INVENTION

A first general aspect of the invention provides a method for producing catalysts for the oxidation of gaseous and vaporous hydrocarbons (VOC) and the catalytic, selective reduction of $DeNO_x$, characterized in that with the compounds of the rare earths and the heavy metals cobalt and manganese, a crystal layer is formed on support bodies as a catalytically active substance in a multi-stage crystallization process.

The foregoing and other features of construction and operation of the invention will be more readily understood and fully appreciated from the following detailed disclosure.

BRIEF DESCRIPTION OF THE INVENTION

Not Applicable

DETAILED DESCRIPTION OF THE INVENTION

Although certain embodiments of the present invention are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

As a preface to the detailed description, it should be noted that, as used in this specification and the appended claims, the singular forms "a", "an" and "the" include plural referents, unless the context clearly dictates otherwise.

A method and device to produce a rare earth and heavy metal catalytic complex is now described.

Starting substances, such as the salts of the rare earths lanthanum, cerium and/or yttrium, and the salts of the metals cobalt and/or manganese are inputted into deionised water in the stoichiometric ratio until a 20 to 60% solution is achieved. The stoichiometric ratio is the amount corresponding to the atomic weight of the involved masses of the reaction partners to the complexes $LaCoO_3$, wherein La can be replaced by cerium and yttrium, and cobalt can be replaced by manganese. In many embodiments, nitrates, carbonates and acetates may be used for the salts. The subsequent burning operation requires a temperature between 500° C. and 761° C. A maximum temperature may be preset to avoid recrystallization. Furthermore, the coarse crystal mixture arising in the heating operation is again dissolved in 20% to 60% oxalic acid until the bottom is low. It is removed from the solution by redecantation. The pure bottom-free solution is again heated to the burning temperature of 500 to 600° C. and thus processed to a fine powder in crystal form.

Next, another oxalic acid solution is admixed in water with 20% to 40% oxalic acid. Molecularly fine alumina (Condea), 10%, and fine Bayer titanium or equivalent $TiO_2$ may then be mixed into this solution. Lastly, the crystal powder produced above is input into the solution. Additionally, the resulting mixture is intensively stirred to a thin-liquid suspension, possibly with addition of further water.

With this suspension, the actual catalyst production is effected by submerging the support bodies having a honeycomb or pouring layer structure into this suspension. It is necessary that the bodies be completely submerged because the fusion effects may unevenly distribute the catalyst on the surface.

Therefore, the produced wet catalysts are processed to finished catalysts in a "calcination furnace" at 450° C. to 550° C. over at least 12 hours. For improved "initiation" of the catalytic reaction, and after the burning process, the catalyst is submerged in a noble metal, such as a platinum or palladium nitrate solution, such that it results in a concentration of a noble element, such as a platinum or palladium, from 0.1 to 0.5 g/l. Moreover, the resulting finished catalyst may be calcined once again over 6 hours at 450° C. to 550° C.

The resulting catalyst bodies may have a uniform crystal structure or crystal layer on the surface, which can be seen in a microscope or scanning electron microscope. The concentration ratios between the rare earths and cobalt or manganese should not fall below the stoichiometric ratio at any point in the process. For instance, the rare earths always have to be present at least stoichiometrically or super-stoichiometrically. Moreover, the distribution of the noble element, such as platinum or palladium, has to be on the crystals in at least 30%, and must not be exclusively bound to the Condea or the titanium dioxide. In one embodiment, laser analysis of the crystal surface may be performed, or analyzed by the REM.

An additional embodiment, as described herein, shows the production of the crystal catalysts according to the invention (i.e. catalysts with applied crystal layers with platinum-like properties by way of the starting materials, such as rare earths including but not limited to lanthanum and cerium, and the heavy metal reaction partner cobalt. The aim of the embodiment is to produce the complex $La_{0.9}Ce_{0.1}CoO_3$ such that no free cobalt is available for decomposition of the crystal, and the complex is completely neutral and non-toxic.

To practice this particular embodiment, the components lanthanum acetate, $La(CH_3COO)_3 \times n\ H_2O$, with a content of $La_2O_3$ of 40%, cerium acetate, $Ce(CH_3COO)_3 \times n\ H_2O$ with a cerium content of $CeO_2$ of 45%, and cobalt acetate $Co(CH_3COO)_2 \times 4H_2O$ with a content of cobalt of 24%, are mixed in the following manner:

430 g lanthanum acetate+45 g cerium acetate+250 g cobalt acetate are mixed into a bath with 3 liters of deionised water in dissolved manner. The solution is brought to temperatures in the vicinity of 100° C. while stirring, and subsequently heated to 600° C. without stirring. Thus, the substances react to a black powder containing the complex $La_{0.9}Ce_{0.1}CoO_3$ in 90% and a mixture of $La_{0.9}Ce_{0.1}$ in 10%.

The excess of $La_{0.9}Ce_{0.1}$ provides stability to the complex and prevents excessive cobalt from becoming active both with respect to the heavy metal loading and with respect to the thermal decomposition of the complex. Thus, the excess of complexes of the rare earths is an important feature of the resulting catalyst crystal. In one example, a result of 300 g black catalyst powder may be obtained.

Moreover, the catalyst powder is again dissolved in a solution of 300 g oxalic acid and 3 liters of water while heating, as well as being heated to 500° C. again, wherein a similar black powder arises. The black power which now arises is similar, but has a much finer crystal structure and a much more uniform element distribution under the scanning electron microscope. In the case of an addition of other rare earths and manganese, the process is repeated a third time until the complete homogeneity is achieved.

The resulting black catalyst powder of 300 g needle crystal material, also called perovskite, is now again stirred in 4 liters of deionised water with 105 g oxalic acid, 100 g Condea and 50 g Bayer titanium, a microgranular titanium oxide. The ceramic bodies to be steeped, and which are to be conditioned to catalysts by submerging in this solution, are previously dried.

Furthermore, a honeycomb body, wound metal bodies with continuous channels, and porous ceramic extrudates are suitable examples of catalyst bodies. As for the ceramic material used with these bodies, magnesium-aluminium-silicate, the cordierite, $SiO_2$ bodies, titanium-tungsten-oxide-honeycombs and alumina suitable materials. Further, magnesium-aluminium-silicate, cordierite, $SiO_2$ bodies, titanium-tungsten-oxide honeycombs are particularly insensitive to expansion and thus are particularly suitable materials.

The catalyst supports are submerged in the catalytic solution such that the porous bodies are uniformly coated, that is, they have to be completely and quickly submerged in order to permit capillary liquid transport within the ceramic as little as possible. If the body is submerged too slowly or on one side, the capillary force of the ceramic body soaks the liquid and the catalytic substance is filtered such that the coating is effected non-uniformly.

After coating by submerging, excessive liquid is separated. This is effected in that the body is placed on a base covered with a screen, which absorbs the excessive liquid. After complete settling of the liquid at the lower end of the honeycomb bodies, they are freed from the liquid at the lower end by shaking-off or slight blow-out such that the bores of the honeycomb bodies are free.

Additionally, after coating, the activation of the catalytic coating is effected in that these bodies are calcined at a temperature of 500° C. over a time period of 2 to 20 hours. That is, the oxalic acid is then completely burned out of the honeycomb body. The burning time depends on the size of the honeycomb bodies, wherein the larger the honey comb body, the longer the burning time.

The honeycomb body provided with a crystal layer is not yet completed for the catalytic efficiency. According to the invention, it has been found that small amounts of noble metals, which are applied thereafter in a separate coating operation, develop a particular efficiency. This is because the noble metals are preliminarily deposited on the crystals of the $La_{0.9}Ce_{0.1}CoO_3$ and $La_{0.9}Ce_{0.1}$. This is effected by steeping with a noble metal solution, such as platinum nitrate, in such a concentration that 1 gram platinum is dissolved in 1 liter deionised water, and also by subsequently burning the ceramic bodies also at 500° C.

Therefore, with respect to the usual noble metal coatings, a very stable positioning of the noble metals results, which achieve a much higher lifetime than upon coating with Condea and Bayer titanium. Moreover, the noble metal brings the coating of $La_{0.9}Ce_{0.1}CoO_3$ and $La_{0.9}Ce_{0.1}$ as an "ignition metal" faster to a full catalytic activity. That is, the catalytic activity of the platinum or other noble metals "ignites" the catalytic activity of the lanthanum-cerium-cobaltite. This interaction also results with catalyst toxins, which differently poison the two catalytic systems $La_{0.9}Ce_{0.1}CoO_3$ and noble metals. The respectively less poisoned system activates the other system.

As a result of the inventive coating, many advantages result, including the advantageous economy of the system. First, the comparable noble metal coating of the same activity necessitates a 20 times higher noble metal amount, and has only ca. 5% of the lifetime compared to the inventive coating, and the catalyst toxins have a reduced influence on the inventive coating. Second, besides the catalytic oxidation of hydrocarbons, the inventive coating gives a completely new, surprising effect; in particular, these honeycomb bodies are capable of selectively removing nitrogen oxides from exhaust gases. That is, the nitrogen oxides are reduced with oxygen containing exhaust gases and the remaining oxygen does not react with the lanthanum-cerium-cobalt surface. However, the process proceeds only as long as until the highest oxidation stage of the catalyst is achieved. Thereafter, the catalyst has to be regenerated again, which is possible with CO and $H_2$.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims. The claims provide the scope of the coverage of the invention and should not be limited to the specific examples provided herein.

The invention claimed is:

1. A method for producing a catalyst complex using a multi-stage crystallization process comprising:
adding a starting substance of a rare earth and a heavy metal at a stoichiometric ratio to form a first stage catalyst complex;
forming a crystal layer on a support body with the first stage catalyst complex as a catalytically active substance in a multi-stage crystallization process; and distributing an amount of a second stage catalyst complex of a noble metal on the first stage catalyst complex.

2. The method according to claim 1, wherein the rare earth and the heavy metal are formed in super-stoichiometric ratio such that an excess of the rare earth results in the crystal layer.

3. The method according to claim 1, wherein the rare earth is lanthanum, cerium, yttrium, and combinations thereof.

4. The method according to claim 1, wherein the heavy metals include cobalt and manganese are used.

5. The method according to claim 1, wherein the starting substances are salts of the rare earths lanthanum, cerium and yttrium, and the salts of the heavy metals cobalt and/or manganese.

6. The method according to claim 1, further comprising:
heating the first stage catalyst complex to 500° C. to 761° C.;
dissolving the first stage catalyst complex in aqueous oxalic acid; and
reheating the first stage catalyst complex to 500° C. to 761° C.

7. The method according to claim 1, wherein is stirred in an another oxalic acid mixture with the addition of alumina, and titanium dioxide, and titanium, after the crystal layer is formed.

8. The method according to claim 1, wherein the finished coated catalyst complex is activated by heating to 500° C.

9. The method according to claim 1, wherein a finished catalyst complex is once again immersed in a noble metal solution and subsequently heated to 500° C. such that the noble metal concentration on the body is between 0.05 and 0.5 g/l.

* * * * *